United States Patent [19]

Martineau et al.

[11] 3,886,070

[45] May 27, 1975

[54] METHOD FOR COMBATTING POLLUTION USING A CHROMIUM COMPLEX

[75] Inventors: Jean Martineau; François-Joseph Biechler, both of Paris, France

[73] Assignee: Seppic, Paris, France

[22] Filed: Feb. 16, 1973

[21] Appl. No.: 332,803

[30] Foreign Application Priority Data

Feb. 18, 1972 France .............................. 72.05609

[52] U.S. Cl. ............................ 210/47; 210/DIG. 21
[51] Int. Cl. ............................................ B01d 11/00
[58] Field of Search .... 210/21, 39, 40, 47, DIG. 21, 210/502, 65; 117/138.8, 143; 260/414, 438.5

[56] References Cited
UNITED STATES PATENTS

| 2,273,040 | 2/1942 | Iler ................................ 117/138.8 B |
| 3,804,661 | 4/1974 | Muntzer et al. ............. 210/DIG. 21 |

FOREIGN PATENTS OR APPLICATIONS

| 1,192,063 | 5/1970 | United Kingdom .......... 210/DIG. 21 |
| 979,978 | 1/1965 | United Kingdom .......... 210/DIG. 21 |
| 1,804,419 | 10/1968 | Germany ..................... 210/DIG. 21 |
| 1,315,980 | 12/1961 | France ......................... 210/DIG. 21 |
| 919,780 | 2/1963 | United Kingdom .......... 210/DIG. 21 |

*Primary Examiner*—Theodore A. Granger
*Attorney, Agent, or Firm*—Bucknam and Archer

[57] ABSTRACT

A process for anchoring a trivalent chromium complex, in which the chromium is co-ordinated to an acrylic carboxylic acid, to solid particles having a grain size of 1 to 600 microns by mixing 5 to 20 weight parts of said particles with one weight part of an aqueous alcoholic solution of said complex and heating the mixture to dryness. Products obtained by this process and their use in combating oil pollution of water.

2 Claims, No Drawings

METHOD FOR COMBATTING POLLUTION USING A CHROMIUM COMPLEX

This invention relates to a process for the preparation of a chromium complex.

In particular, this invention relates to a process for the production of solid particles having a complex Werner compound anchored to their surface, to the new particles obtained by this process and to their use in the prevention of water pollution by oily products.

U.S. Pat. No. 2,273,040 discloses that Werner complexes, in which a trivalent chromium atom is attached through coordination to an acyclic carboxylic acid having at least 7 carbon atoms, are able to impart hydrophobic properties to the surfaces to which they are anchored. Complexes of this kind are marketed in the form of aqueous, alcoholic solutions and they correspond to the following formula (I):

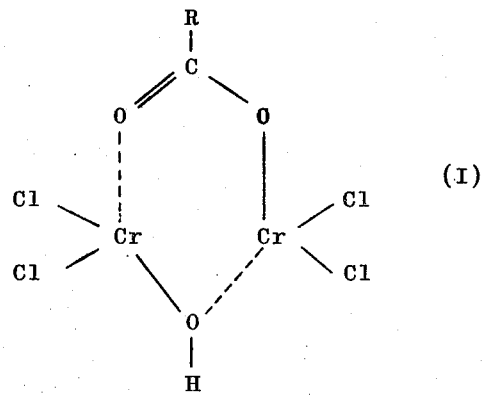

(I)

in which R is a saturated or unsaturated linear or branched alkyl radical having at least 7 carbon atoms.

For example, Werner chromium complexes in the form of chromium stearato chlorides, in which R is the radical $C_{17}H_{35}$, have been used for this purpose.

U.S. Pat. No. 2,273,040 also describes a process for treating solid silica-containing particles with these complexes, in which the solid particles are suspended in water, the pH value of the resulting suspension is adjusted to a predetermined value, a solution of the chromium complex added and, after mixing, the resulting solid product is dried at a temperature of 110°C.

It is also stated in this patent specification that when the resulting solid product is introduced into an oily phase in a liquid phase, the product passes completely into the oily phase.

It is an object of the present invention to provide an improved process for anchoring a chromium complex to small solid particles.

It is a further object of this invention to provide a novel product comprising a chromium complex anchored to small solid particles and to the use of this product for combating oil pollution of waters.

The present invention relates to an improved process for the production of solid products obtained by the action of at least one trivalent chromium complex corresponding to the formula (I) previously defined on small solid particles, to the new products thus obtained and, also, to a process for preventing the pollution of waters by oils, optionally with recovery of the treated oils.

Accordingly, the invention provides an improved process for anchoring a trivalent chromium complex, in which the chromium is attached by coordination to an acyclic carboxylic acid having at least 7 carbon atoms and which is in the form of an aqueous alcohol solution to solid particles having an average grain size in the range of from 1 to 600 microns, wherein from 5 to 20 parts by weight of said solid particles are contacted in an internal mixer, for a period of about 15 minutes, with 1 part by weight of said aqueous alcoholic solution containing from 20 to 30 % by weight of the chromium complex, and wherein the resulting mixture is heated to dryness at a temperature in the range of from 100° to 120°C.

The process according to the invention is thus considerably simpler than the process described in U.S. Pat. No. 2,273,040.

We have also found that the process results in an extremely regular impregnation of the surface of the treated particles. By virtue of the favourable distribution of the complex, it also enables the mineral particles to be treated with the exact quantity of Werner complex required to saturate the surface of the particles with the complex.

Another advantage of the process according to the invention is that there is no need for the solid particles to be filtered, which is of particular benefit in the case of very small particles which are difficult to filter.

The invention also relates to a method of preventing the pollution of waters with oils and petroleum products.

Several solutions have been proposed for preventing this form of pollution. For example, it has been proposed to add one or more emulsifiers to oil slicks. However, such a process is expensive insofar as it necessitates the use of expensive products and considerable energy for effectively agitating the treated medium. Furthermore, this process is often harmful to fish due to the noxious effect of the surfactants upon the organism of these animals. Another proposal has been to distribute a mixture of sand and fatty amines over oil slicks whereupon the resulting mixture takes the slick to the bottom of the sea where it forms a layer that is difficult to degrade. In addition, the mixture of sand and fatty amines separates through inadequate cohesion, liberating petroleum particles which ascend back to the surface of the sea. It has also been reported that, by treating particles of clays or silica-containing materials having a grain size in excess of 250 microns with certain Werner complexes, it is possible to obtain a product which cannot be wetted with water although it can be wetted with oil. When a product of this kind is brought into contact with an oil slick floating on the surface of water, a certain number of individual particles is formed, retaining the oil and carrying it to the bottom of the sea-bed.

These various solutions are attended by various disadvantages, with the result that they cannot be applied on a large scale.

The process according to the invention is distinguished by the fact that the support treated with a Werner complex as previously described is added to the oil slick in a quantity of from 1 to 4 parts by weight for 1 parts by weight of oil.

In every case, it was found that a kind of paste is formed through the combination of the oily products with the treated support added to them.

Another very important feature of the present invention is the formation of a paste or cake which differs in its buoyancy according to the grain size of the mineral support used.

Thus, if the grain size of the support is less than about 100 $\mu$, preferably in the range of from 2 to 10 $\mu$, a paste or cake floating on the surface of the water is obtained. This paste or cake can readily be recovered, thus preventing shallow beds and beaches from being soiled and polluted.

By contrast, if the grain size of the support is greater than about 100 $\mu$, preferably in the range of from 500 to 600 $\mu$, a paste or a cake is obtained which sinks to the bottom of the water.

This process is of great value in areas of considerable depth where it is often difficult to recover the oily products due to the considerable distance from coastlines.

The advantage of obtaining a paste of this kind in that, in every case, there is no dispersion of oily products (complexes of oil and treated particles) in the water. In addition, however, when the paste formed floats on the surface of the water, it can be collected and the oily products present in it recovered by a suitable treatment comprising contacting the paste with an aromatic hydrocarbon, for example, benzene or xylene.

The invention is illustrated by but by no means limited to the following examples.

EXAMPLE 1

Preparation according to the invention 1,000 kg of a silicate of alumina and magnesia in the form of particles having an average grain size of about 590 microns were introduced into a 5,000 litre capacity band mixer. The agitator was switched on, and 100 litres of an aqueous alcohol solution containing 25 % by weight of chromium stearato chloride were injected.

The mass remained free flowing. After 15 minutes, it was discharged into a furnace which was maintained at 120°C for a period of 5 minutes after which the product was ready for use.

EXAMPLE 2

Continuous preparation of a new product according to the invention

The mineral support can also be continuously produced, for example in a rotary furnace, for example 5 metres in length and 0.75 metre in diameter, which is able to rotate at variable speeds. The first third of the length of the furnace is at ambient temperature, the remainder being heated in such a way that, at the output end of the furnace, the treated supports are at a temperature of 120°C.

Kaolin having an average particle size of 4 microns was introduced into the cold part of the furnace (which was in operation), and a 30 % solution of the chromium complex in myristic acid was sprayed in a ratio of 5 parts of kaolin to 1 part of solution.

The support thus treated advanced through the hot part of the rotary furnace. Input of the kaolin and Werner complex solution was regulated through the rotational speed of the furnace so that the product left the furnace with a temperature of 120°C.

In this way a dry powder-like product was obtained. Its coating was insoluble in water and solvents whilst its fatty acid radical served as an anchoring element for petroleum products.

One extremely important factor which should be noted is that these Werner complexes are not toxic. They can be used for the treatment of wrapping papers of the kind which come into contact with such foods as meat, fish and sweets. The main object of treating the paper in this way is to render it impermeable to water which not only makes it waterproof, but also prevents if from sticking to the foodstuffs wrapped in it.

This example was repeated with various solid supports such as silica and sand.

In every case, it was found that the resulting product underwent some biological degradation when brought into contact with river water or sea water. This can be demonstrated as follows: kaolin particles having an average grain size of 4 microns treated as described in Example 2 were distributed over sea water. Particles of this kind float on the surface of the water. After 3 days, the particles sank to the bottom of the sea-bed. This was due to the biodegradation of the fatty acid attached to the chromium atom which remained anchored to the surface of the mineral support.

EXAMPLE 3

Treatment of petroleum products floating on the surface of water 1 kg of crude petroleum was poured on to the surface of sea water. 3 kg of a fine sand (average grain size 590 microns) treated with a Werner complex as indicated in Example 1 were added to the petrol. A continuous pasty layer of petroleum product was formed, sinking to the bottom of the sea after about 1 hour. This continuous pasty layer retained its structure for a few months until the biodegradable products present in it were biologically degraded.

EXAMPLE 4

The procedure of Example 3 was repeated using the solid treatment product obtained in accordance with Example 2 (diameter of the kaolin particles 4 microns). Approximately 2 kg of this product were used to treat 1 kg of crude petroleum. A paste was obtained which floated on the surface of the sea for 2 to 3 days.

The paste obtained in this way was readily recovered and treated with xylene. It was thus possible to recover all the petroleum present in the paste by extraction. This process precludes any possibility of subsequent pollution because the pollutant extracted from the aqueous medium is either burnt or recovered.

Thus, it has been shown that, if the supports used have average particle diameters in the range of from 600 to 100 microns, treatment of oil slicks on water with the product according to the invention results in the precipitation to the bottom of the water of a solid product (paste or cake) formed by adsorption of the petroleum products treated on the products according to the invention. If, by contrast, supports having an average grain size of less than 100 microns are used, the composite product formed through adsorption of the petroleum products treated on the products according to the invention floats on the surface of the sea. In this case, the composite product can be "creamed off" from the surface of the sea and then either burnt or treated with a solvent with a view to recovering the petroleum products (aromatic solvents can be used with particular advantage for this treatment).

It is clear that the products according to the invention can be used for the treatment of fatty products other than petroleum products. Thus, it is possible to treat other oily products of mineral or vegetable origin for example, linseed oil.

It should also be noted that the quantities of Werner's chromium complex which can be used in accordance with the invention are extremely variable. The mineral support can either be saturated with the complex or alternatively the complex can be used in sub-saturation quantities. Any average expert will readily be able to determine this saturation point in dependence upon the nature and state of the support through a few preliminary tests. If an excess of complex is used, subsequent contact between the free complex and water (or moisture) will result in decomposition of the free complex and precipitation of chromium hydroxide.

It is to be understood that the examples presented herein are for illustrative purposes only and are not intended to limit the scope of our invention.

We claim:

1. A method of combating the pollution of waters by oily products by forming a paste of the oily products, which paste floats on the surface of the water and is removed therefrom by skimming, said method comprising the steps of:

a. preparing a product comprising a chromium complex anchored to solid particles of a metallic aluminosilicate wherein the chromium complex is coordinated to an acyclic carboxylic acid having at least 7 carbon atoms, by contacting for a period of about 15 minutes from about 5 to 20 parts by weight of solid particles of an aluminosilicate of less than 100 micron average particle size with 1 part by weight of an aqueous alcoholic solution containing from about 20 to 30% by weight of said coordinated chromium complex, b. heating the mixture to dryness at a temperature of from about 100° to 120° C., c. distributing from 1 to 4 parts by weight of said dried product over 1 part by weight of said oily product floating on the surface of said waters whereby said oily product forms a paste floating on the surface of the waters, d. removing said paste from the surface of the water by skimming it therefrom.

2. A method according to claim 1, in which said paste is treated with an aromatic solvent to extract said oily products present therein.

* * * * *